United States Patent Office 3,046,232
Patented July 24, 1962

---

3,046,232
METHOD OF PRODUCING A CHELATING CAUSTIC COMPOSITION
Paul W. Bonewitz, Burlington, Iowa, assignor to Bonewitz Chemicals, Inc., Burlington, Iowa, a corporation of Iowa
No Drawing. Filed Nov. 21, 1958, Ser. No. 775,343
5 Claims. (Cl. 252—156)

This invention relates to methods of manufacturing a mixture of an alkali metal gluconate and an alkali metal hydroxide.

It is an object of the present invention to increase the effectiveness of an alkali metal gluconate and alkali metal hydroxide mixture as a cleansing agent.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that highly effective cleaning materials and water treatment materials can be prepared by adding to a mixture of a solid alkali metal hydroxide and a solid alkali metal gluconate, a small amount of aqueous alkali metal hydroxide, preferably of about 50% concentration.

The resulting product is a very effective cleaning agent in water and is particularly effective in the treatment of hard water.

The addition of a small amount of aqueous alkali metal hydroxide to a mixture of solid alkali metal hydroxide and solid alkali metal gluconate unexpectedly gives improved cleansing effectiveness.

The addition of the small amount of aqueous sodium hydroxide solution to the mixture of caustic soda and sodium gluconate, is that in this manner moisture is added to the caustic mixture without excess heat of reaction. This in turn results in partial hydrolysis of the sodium gluconate, effecting a more powerful water conditioning agent which has twice the potency of a simple mechanical mixture of the same amounts of gluconate and the caustic soda.

Whereas a given amount of the latter mixture provides sequestering power for 20 grains of hardness, an equivalent amount of the composition herein described will easily handle twice that, or at least 40 grains of hardness.

This increased sequestering power appears to be due to the partial hydrolysis of the gluconate by the sodium hydroxide solution.

In preparing the particles in which form the product appears, the solid sodium gluconate in an amount 1% to 30% preferably 10% is added to 70 to 98%, preferably 87%, of solid caustic soda in a mixer and the combination is subjected to the mechanical agitation of the mixing apparatus. Immediately after the mixer is started ½ to 10%, preferably 2 to 3% of a 50% sodium hydroxide solution is added. The sodium hydroxide solution can be of 20 to 73% concentration.

In place of caustic soda there can be used potassium hydroxide and in place of sodium gluconate there can be employed potassium gluconate. Unless otherwise indicated all parts and percentages are by weight.

Example I 87 parts of solid sodium hydroxide and 10 parts of solid sodium gluconate were placed in a conventional powder mixer. Immediately thereafter 3 parts of a 50% aqueous sodium hydroxide solution was added and mixing was continued for ten minutes to obtain a uniform product. 100 parts of this product removed 40 grains of permanent hardness from water while a simple mechanical mixture of the same amount of sodium hydroxide and sodium gluconate only removed 20 grains of permanent hardness.

I claim:
1. A process of producing a chelating caustic composition, which comprises adding about ½ to 10% concentrated aqueous caustic soda solution to a mixture of 70 to 98% solid caustic soda and 2 to 30% of solid sodium gluconate.
2. The process of claim 1 wherein the solid sodium hydroxide is used in an amount of 87%, the sodium gluconate is used in an amount of 10% and the sodium hydroxide solution is used in an amount of 3%.
3. The process of claim 2 wherein the sodium hydroxide solution has a concentration of 50%.
4. The process of claim 3 wherein the sodium hydroxide solution is added immediately after the mixing begins.
5. A process of producing a chelating caustic composition which comprises adding about ½ to 10% of a concentrated aqueous caustic solution selected from the group consisting of a solution of potassium hydroxide and a solution of sodium hydroxide to a mixture of 70 to 98% of a member of the group consisting of solid caustic soda and solid potassium hydroxide and 2 to 30% of a member of the group consisting of solid sodium gluconate and solid potassium gluconate.

References Cited in the file of this patent

UNITED STATES PATENTS

| | | |
|---|---|---|
| 2,584,017 | Dvorkovitz | Jan. 29, 1952 |
| 2,678,303 | Bonewitz et al. | May 11, 1954 |
| 2,767,146 | Bonewitz et al. | Oct. 16, 1956 |
| 2,804,432 | Bonewitz et al. | Aug. 27, 1957 |
| 2,826,552 | Bonewitz et al. | Mar. 11, 1958 |